Sept. 14, 1954

H. C. WAUGH 2,689,218

AUTOMATIC WATER SOFTENER

Filed Feb. 4, 1949

INVENTOR
Harvey C. Waugh.
BY
ATTORNEYS

Sept. 14, 1954      H. C. WAUGH      2,689,218
AUTOMATIC WATER SOFTENER

Filed Feb. 4, 1949      7 Sheets-Sheet 2

INVENTOR
Harvey C. Waugh,
BY
ATTORNEYS

INVENTOR
Harvey C. Waugh
BY
ATTORNEYS

Sept. 14, 1954     H. C. WAUGH     2,689,218
AUTOMATIC WATER SOFTENER Filed Feb. 4, 1949     7 Sheets-Sheet 7

INVENTOR
Harvey C. Waugh.
BY
ATTORNEYS

Patented Sept. 14, 1954

2,689,218

UNITED STATES PATENT OFFICE 2,689,218

AUTOMATIC WATER SOFTENER

Harvey C. Waugh, Drexel Hill, Pa., assignor to American Water Softener Company, Philadelphia, Pa., a corporation of New Jersey Application February 4, 1949, Serial No. 74,536

12 Claims. (Cl. 210—24)

The present invention relates to automatic water softening.

The process claims originally appearing in this application have been divided and are contained in application Serial No. 253,327, filed October 26, 1951, for Automatic Water Softener.

A purpose of the invention is to improve the construction of automatic water softeners so that they can operate more reliably and with less maintenance and service.

A further purpose is to simplify and cheapen the initial construction of automatic water softeners by eliminating elaborate programming devices which are likely to get out of order, and by more closely interrelating the drive, the valve motion and the electrical control so as to reduce the likelihood that failure of components will produce unsatisfactory water softening.

A further purpose is to produce electrical impulses from a water meter responsive to the flow of water through a softener, to count the impulses on a counter, to count out the counter at a predetermined count, to start a backwash timer in response to the counting out of the counter, to start a brining timer in response to the timing out of the backwash timer and to restore the softener to softening when the brining timer has timed out.

A further purpose is to advance a rotary valve to the backwash position in response to the counting out of the counter, to the brining position in response to the timing out of the backwash timer and again to the softening position in response to the timing out of the brining timer, while stopping the rotary valve in each position due to the action of limit switches.

A further purpose is to provide a measured quantity of brine, and to introduce water and brine simultaneously into the softener during the brining and continue the flow of water for rinsing purposes when the brine has been expended, thus avoiding the necessity of an additional control to determine the end of the brining and the beginning of the rinsing.

Further purposes appear in the specification and in the claims.

In the drawings I have chosen to illustrate one only of the numerous embodiments in which my invention may appear, choosing the form shown from the standpoints of convenience in illustration, satisfactory operation and clear demonstration of the principles involved.

Describing in illustration but not in limitation and referring to the drawings:

In the prior art efforts have been made to produce automatic water softeners which can be operated with supervision only at infrequent intervals. Such devices have been very expensive due to the complicated program devices required and have in many cases been very vulnerable to interruption in service, as there has been insufficient interlocks and insufficient foolproofing connections to prevent difficulty where certain components function improperly.

In the present invention, arrangements for controlling the program of the softener have been greatly simplified, and the hydraulic, electrical and mechanical parts have been so closely interrelated as to reduce to a minimum the likelihood of failure to function, and to decrease the cost of maintenance. The control in the present invention is accomplished rather simply by a counter and a series of timers interrelated with a water meter, a rotary valve and requisite switching.

Figure 7:
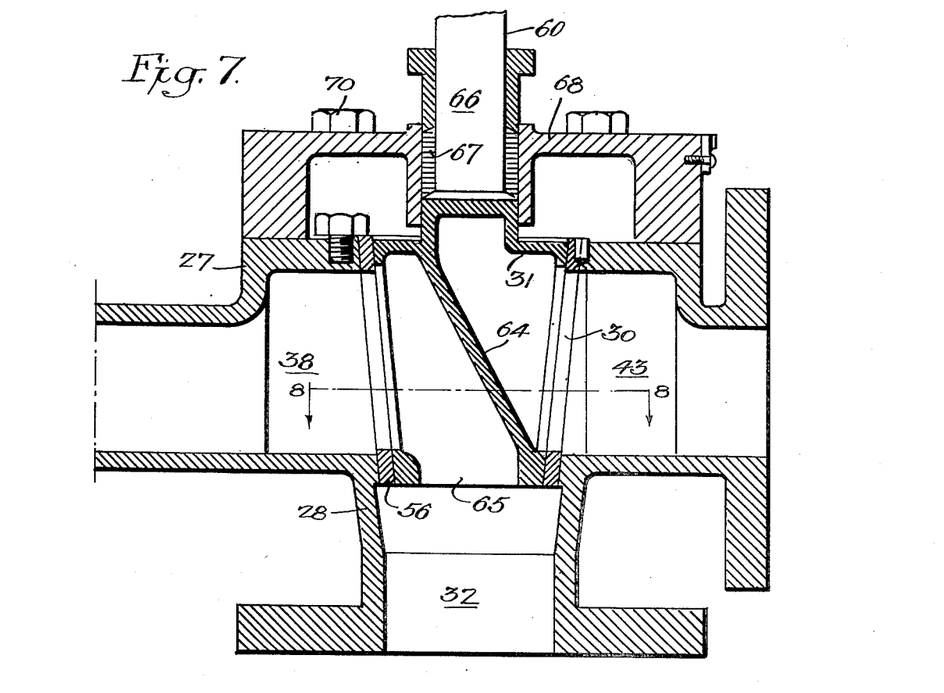
Figure 7 is an axial section of the rotary valve.
Figure 8:
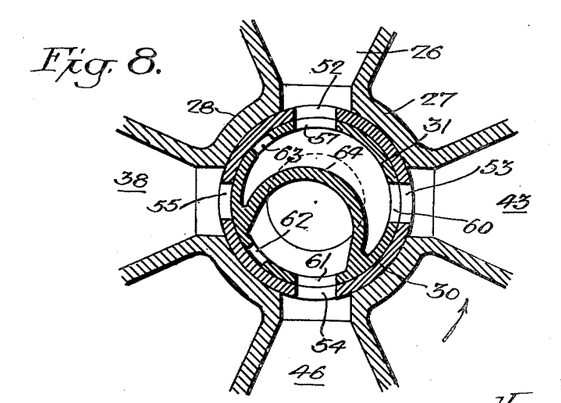
Figure 8 is a section of Figure 7 on the line 8—8.

Referring particularly to Figures 1 to 5 inclusive, the water softener mechanism in accordance with the invention comprises a water softener tank 20 resting on a base 21 and containing a charge 22 of zeolite or other water softening material accessible through an access opening 23. The water softener has a normal water inlet pipe or connection 24 near the top and a normal water outlet pipe or connection 25 near the bottom. The normal inlet connection to the water softener is connected to a suitable radial port 26 in the housing 27 of a motor driven rotary valve 28 (Figures 7 and 8) having a conical seat 30 and an interior cooperating plug valve member 31. The normal outlet connection 25 from the water softener tank enters a port 32 in the bottom of the valve housing which communicates with the valve as later explained. Of course it will be understood that the construction of the valve can be varied to meet the requirements of the particular installation.

Beneath the level of the water softener tank is located a drain 33 (Figure 1) which receives drain water from a sump 34 having a baffle 35 extending downward from the top and across the sump and having a weir 36 extending upward from the bottom to a point above the level of the bottom of the baffle, so that drain water must pass under the baffle and over the weir. The weir may be desirably equipped with a head gauge 37. The rotary valve is connected through a port 38 with a pipe 40 extending into the sump 34 on the opposite side of the baffle with respect to the weir. The pipe 40 is equipped with a float valve 41 having a float 42 which opens the valve when the water in the sump lowers to a predetermined level, and closes the valve when the water in the sump becomes unduly high.

The rotary valve is also connected by a port 43 with an inlet pipe 44 to the water softening device, desirably controlled by a shut-off valve 45, which is normally open and manually operated.

A port 46 in the rotary valve housing communicates by a pipe 47 through a water meter 48 and a check valve 50 (opening in the direction of effluent flow) with the soft water service 51 by which the water softened by the softener is taken to the point of use.

The valve seat 30 is provided with radial ports 52, 53, 54 and 55 respectively cooperating with radial ports 26, 43, 46 and 38 in the housing. Likewise one end 56 of the valve seat is open for communication with the port 32 at the end of the housing. The valve seat of course remains stationary as the valve turns.

The rotary valve 31 has radial ports 57, 60, 61, 62 and 63, and is provided with a diagonal internal partition 64, placing the ports 61 and 62 on one side of the partition and the other ports on the opposite side thereof. The end of the valve adjoining the port 32 in the housing has a port 65 for communicating with the port 32 endwise of the valve.

The rotary valve has a stem 66 extending from the end opposite to the port 65 and has an antifriction metal bearing and packing 67 on the stem engaging the center bore of a head 68 secured to the valve housing by bolts 70.

Brine is prepared in a makeup tank 71 which receives fresh water through a filling pipe 72 branching from the raw water inlet pipe 44, controlled by a shutoff valve 73, and when the shutoff valve is open, regulated by a float valve 74 inside the tank. A perforated brine collector pipe 75 extends across the bottom of the brine makeup tank and is carried through a shutoff valve 76 (open when the system is in operation), a solenoid valve 77 and a shutoff valve 78 (normally open when the system is in operation) into a brine measuring tank 80. The brine make-up tank will desirably be very large compared to the brine measuring tank.

Near the bottom of the brine measuring tank 80 is an outlet float valve 81 which remains open when the brine level is high but closes when the brine level drops to a predetermined lower level in the tank, and the float valve 81 discharges through suitable piping and a check valve 82 (opening in the direction toward the water softener) and then through the suction connection of a suitable pump 83, preferably an eductor which discharges by a pipe 84 into the water softener tank near the top. The water jet connection to the eductor is through a pipe 85 from the main raw water inlet pipe 44, through a shutoff valve 86 (normally open while the system is in operation) and then through a solenoid valve 87.

The water softener tank is provided with an overflow pipe 88 extending from the top of the tank to the sump, and the brine makeup tank is provided with an overflow pipe 90 extending from the brine makeup tank near the top into the sump. The overflow pipe from the water softener is controlled by a shutoff valve 91. The softener is equipped with a suitable pressure gage and pressure gage connections 92.

The rotary valve 28 is operated by an electric motor and speed reducer 93 interconnected to the stem 66 of the rotary valve by a chain and sprocket drive 94. An electric motor 95 of the motor and speed reducer unit is operated to shift the valve as later explained. The stem 66 of the valve also is interconnected to a rotary limit switch assembly 96 by a chain and sprocket drive 97, the sprockets of which are of one to one ratio so that the limit switch assembly moves around its circumference proportionally to the motion of the rotary valve. The limit switch assembly is desirably located in a timer housing 98 provided on the front of the water softener.

Figure 1:
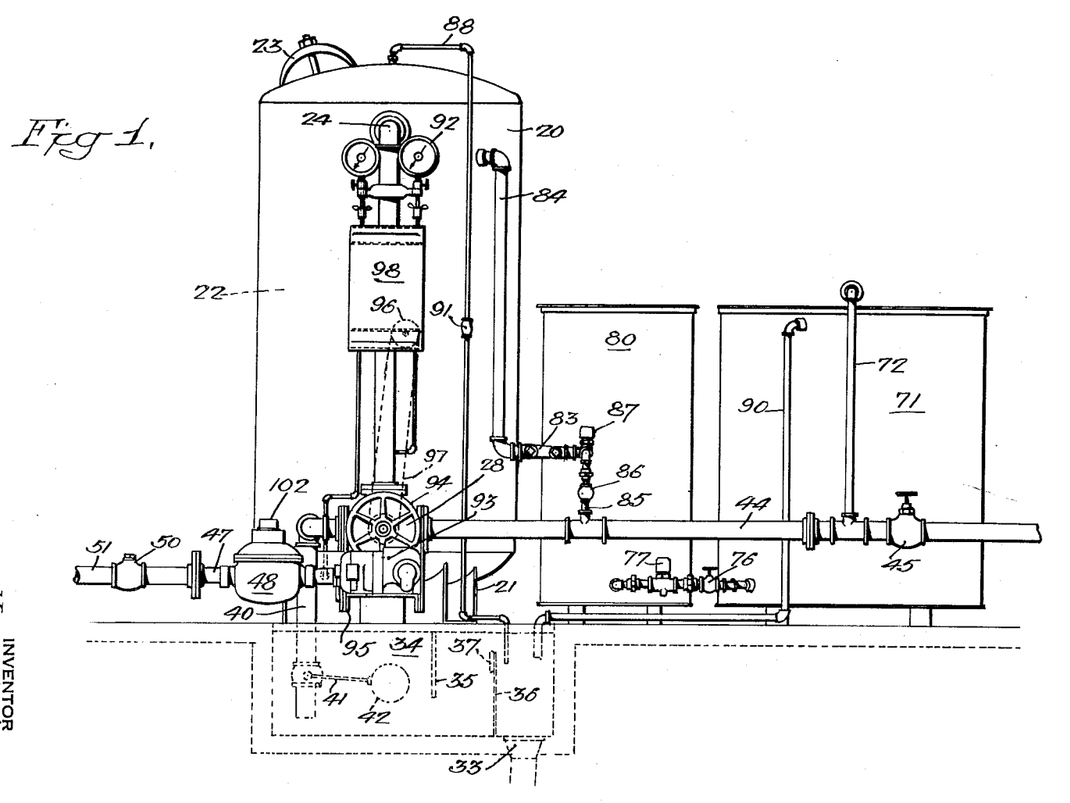
Figure 1 is a diagrammatic side elevation of an automatic water softener manufactured in accordance with the invention.
Figure 2:
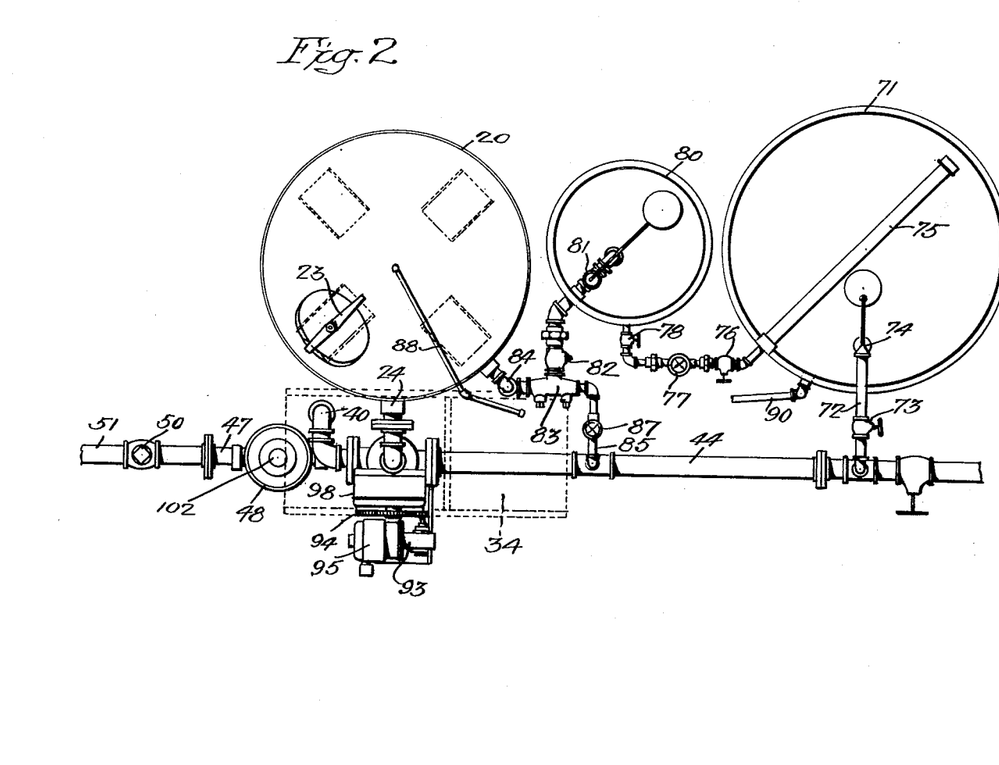
Figure 2 is a top plan view of Figure 1.
Figure 3:
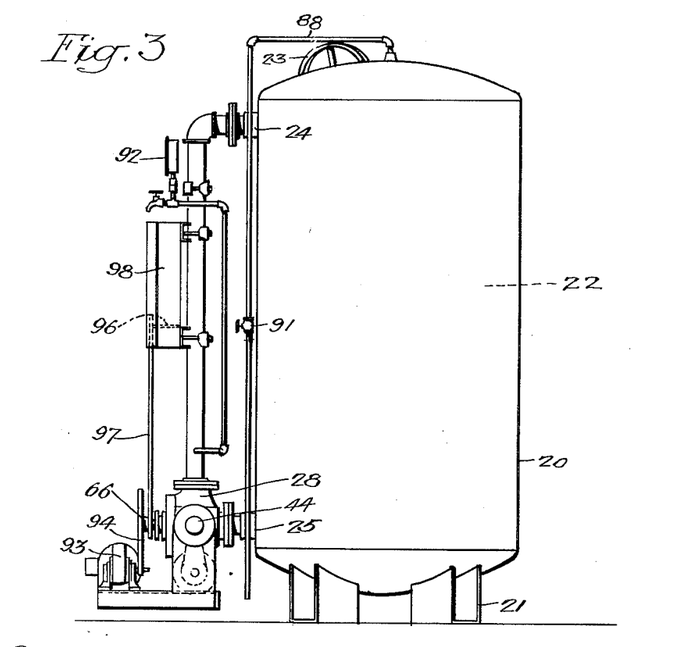
Figure 3 is a right end elevation of Figure 1 omitting the brine makeup and brine supply tanks.
Figure 4:
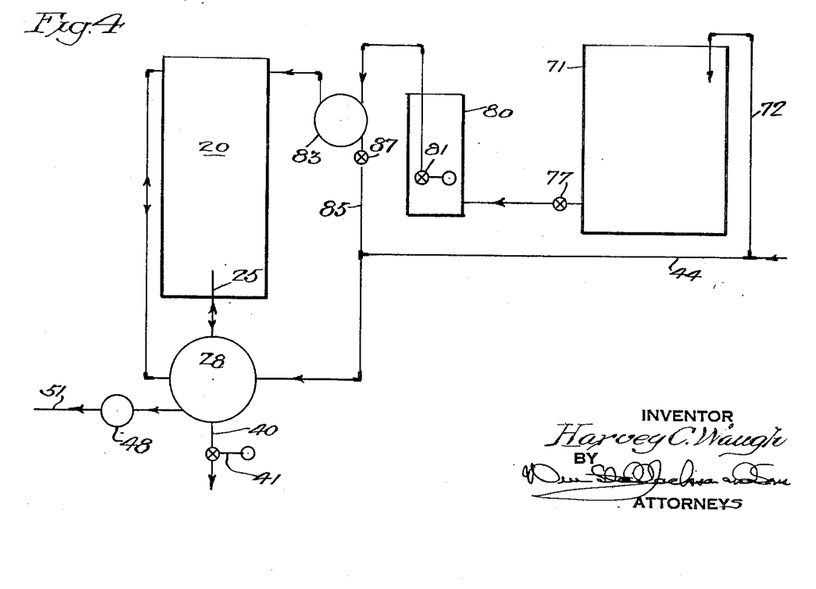
Figure 4 is a flow sheet showing the main component parts in their relation to the rotary valve.
Figure 5:
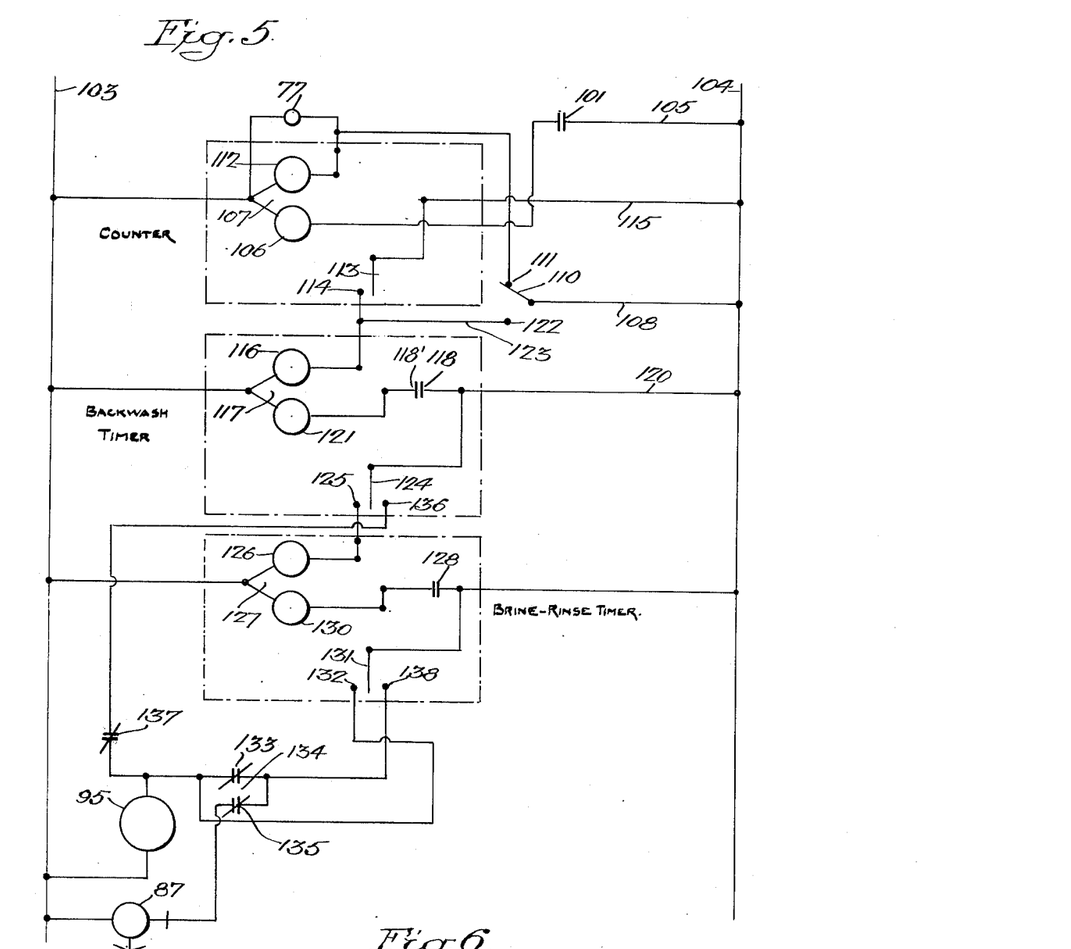
Figure 5 is a circuit diagram useful in explaining the invention.

The water meter 48 carries on its rotor shaft contacts 101 (Figure 5) in a contact housing 102 (Figures 1 and 2). The contacts suitably close once in each revolution of the selected shaft of the water meter. Referring particularly to Figure 5, a source of suitably alternating current is connected to lines 103 and 104. The water meter contacts 101 are connected by electrical connections 105 with a ratchet solenoid coil 106 of a counter 107. By electrical connections 108 a movable limit switch contact 110 connected to a fixed contact 111 is connected in series across the line with an electromagnetic clutch 112 of the counter 107. The electromagnet of solenoid valve 77 is placed in series with the limit switch contacts 110, 111 and in parallel with the clutch 112.

When the counter 107 counts out as later explained, it completes the electrical circuit through a movable contact 113 and fixed contact 114 in series across the line through connections 115 with an electromagnetic clutch 116 of an electric timer 117. When the clutch 116 is energized, it mechanically closes timer motor contacts 113 and 118', which are in series across the line through connections 120 with timer motor 121, suitably a synchronous motor.

Movable limit switch contact 110 is of double throw type and in its opposite position makes contact with fixed contact 122 in electrical connections 123 in series with timer clutch electromagnet 116 across the line.

When timer clutch electromagnet 116 is energized, it completes the circuit through backwash timer movable contact 124 and fixed contact 125, in series across the line with the electromagnet clutch coil 126 of brine-rinse timer 127. When timer clutch electromagnet clutch coil 126 is energized it closes timer motor contacts 128 in series with brine rinse timer motor 130 across the line. When brine rinse clutch electromagnet 126 is energized, it also brings movable switch contact 131 into connection with fixed switch contact 132, placing rotary valve motor 95 in series with limit switch contacts 133 of limit switch 134 which is of double pole double throw type, and provided with another set of contacts 135.

The backwash timer movable switch contact 124 is of single pole double throw type, having an opposite fixed contact 136 which is closed when the backwash timer times out, placing rotary valve motor 95 across the line in series with limit switch 137.

Likewise the brine-rinse timer movable switch is of double throw type, and movable contact 131 engages fixed contact 138 when the brine-rinse timer times out, placing the electromagnet of solenoid valve 87 across the line through limit switch contacts 135, which are then closed.

Figure 6:
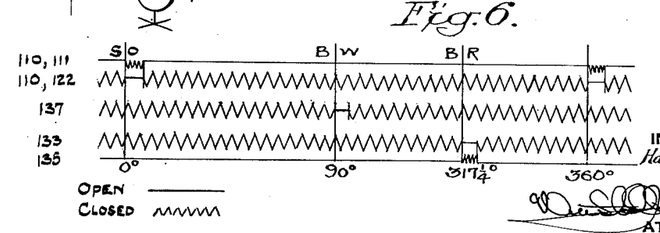
Figure 6 is a limit switch diagram showing the limit switch positions.

By reference to Figure 6 the relationship of the respective limit switches 110, 111; 110, 122; 137, 133 and 135 will be apparent. In the softening position (SO or 0° on Figure 6) limit switch 110, 111 is closed, limit switch 110, 122 is open, limit switch 137 is closed, limit switch 133 is closed and limit switch 135 is open. As the limit switch assembly advances toward the backwash position, limit switch 110, 111 opens and remains open for the rest of the cycle, while limit switch 110, 122 closes and remains closed until the softening position is reached on the next cycle, and limit switches 137 and 133 remain closed while limit switch 135 remains open.

When the backwash position (BW or 90°) is reached, limit switch 137 opens, and remains open until the limit switch assembly has advanced beyond the backwash position, after which it again closes and remains closed to and including the start of the next cycle.

At the brining position (BR, conveniently located at 317¼°) limit switch 133 opens while limit switch 135 closes, and shortly beyond the brining position limit switch 133 again closes and remains closed for the rest of the cycle, while limit switch 135 again opens and remains open for the remainder of the cycle.

Figure 9:
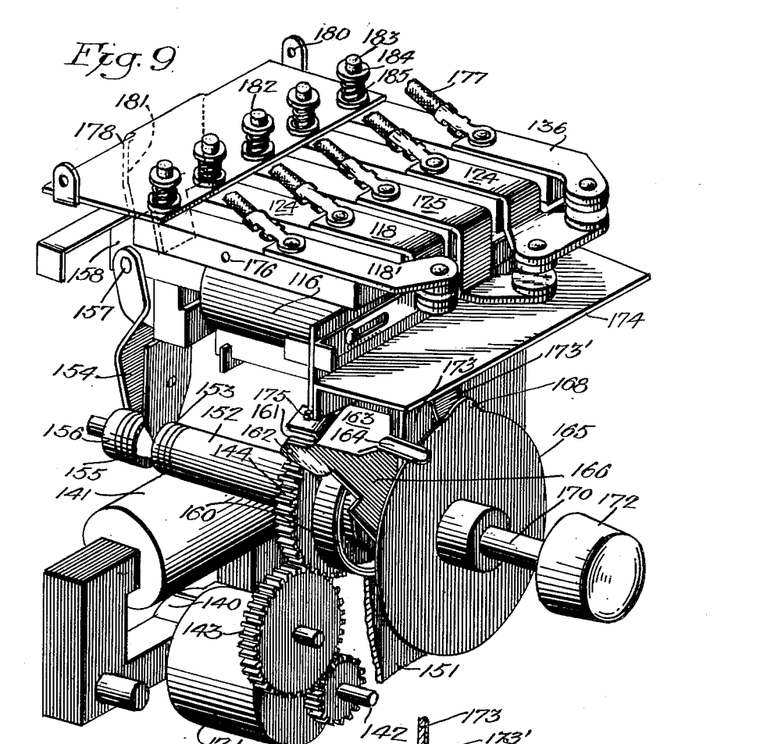
Figure 9 is a diagrammatic perspective of a timer which may be employed in the invention.
Figure 9A:
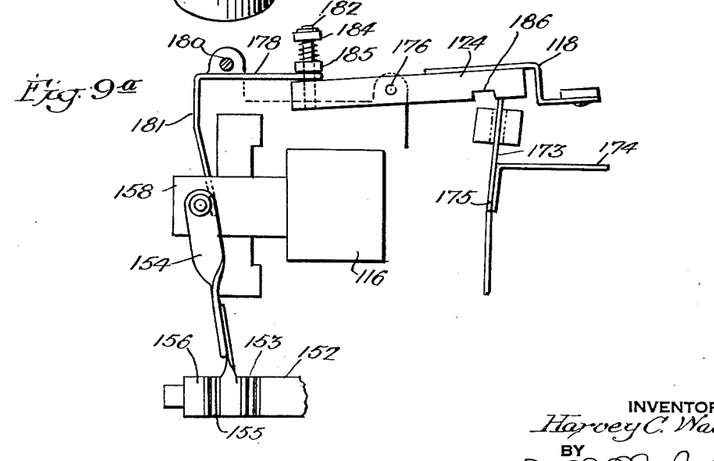
Figure 9a is a fragment of one of the timer contacts shown in elevation, and the tripping lever shown in transverse section, to illustrate the engagement of the tripping lever in the notch beneath the insulation of the contact.
Figure 10:
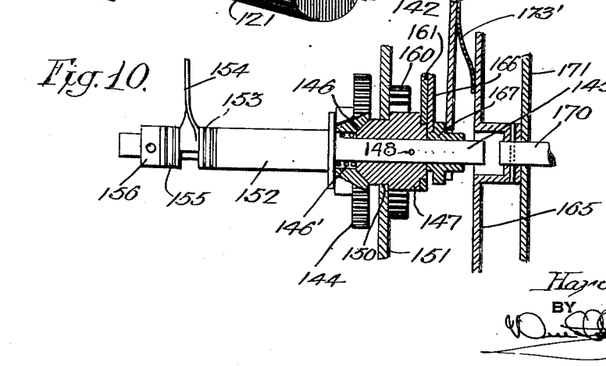
Figure 10 is a fragmentary axial section through the timer of Figure 9.

The timer employed in the device of the invention may be of any suitable commercial type, of which a typical and very satisfactory form is illustrated in Figures 9, 9a and 10. For convenience this will be considered to be the backwash timer, although it will be evident that the same structure might be employed as a brine-rinse timer. The synchronous motor 121 has an armature 140 and a field 141. The motor drives a shaft 142 which interconnects by speed reduction gearing 143 with a clutch gear 144 which surrounds and is rotatable with respect to a shaft 145 (best seen in Figure 10). The clutch gear has a suitably conical clutch engaging face 146 at one end which makes engagement with a clutch 147 pinned on the shaft 145 at 148. The clutch suitably has bearing mounting at 150 in the frame 151 of the timer. On the opposite end of the shaft 145 from the clutch 147 and suitably free with respect to the shaft is a collar 152 secured to the clutch gear 144 which at its rearward end engages washers 153 around the shaft which are contacted endwise by a clutch operating lever 154. Inside the clutch gear and between the clutch and the collar 152 is a compression spring 146' (Figure 10) around the shaft, urging the clutch gear away from the clutch when permitted by the clutch operating lever 154. On the opposite side of the clutch operating lever 154, the lever is held in position by washers 155 on the shaft and a collar 156 suitably secured to the shaft. The clutch operating lever 154 desirably is resilient to permit overtravel and to return the clutch and solenoid armature and associated parts to be described when the clutch is released, and at its opposite end makes pivotal connection at 157 with a sliding armature 158 of the clutch solenoid 116. The solenoid 116 and the synchronous motor 121 are electrically connected as shown in Figure 5. Thus by energizing the solenoid the clutch is engaged so that the motion of the synchronous motor is transmitted through the gearing and clutch to rotate the shaft 145.

A spiral spring 160 is secured at one end to the frame 151 and at the other end to the clutch 147 (at points not shown), tending to return the shaft 145 to zero against a suitable stop, not shown.

Figure 11:
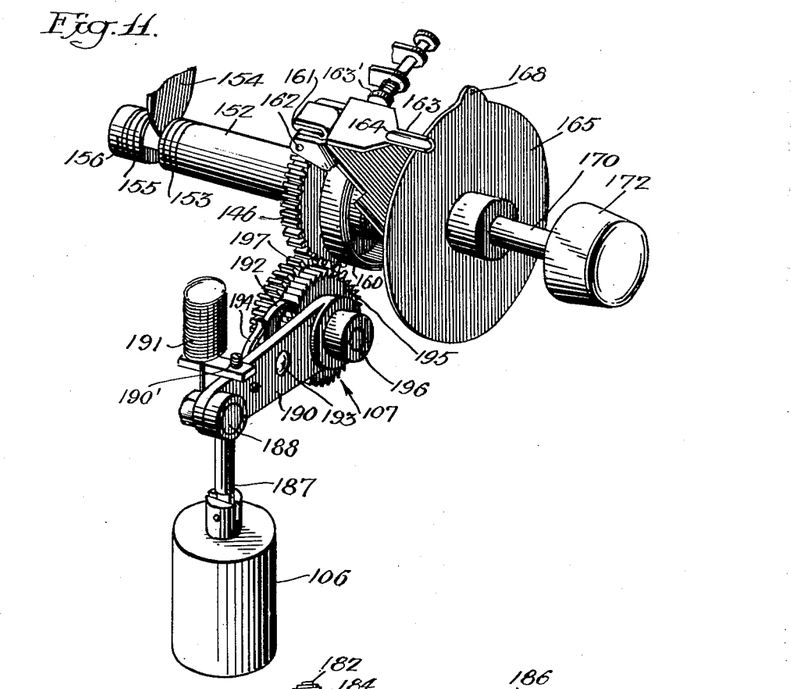
Figure 11 is a fragmentary variation of Figures 9 and 10, shown in perspective, to illustrate one form of counter which may be used.

Suitably mounted on the clutch 147 is a timer arm 161 which turns with the shaft 145 and pivotally mounts at 162 at its outer end a tripping bellcrank 163 (Figure 9) having one arm 164 which follows the surface of a timer cam 165 coaxial with the shaft and an opposite arm 166 (Figures 9 and 10) which extends into a position surrounding the shaft and engages the side toward the clutch of a sliding collar 167 on the shaft but free therefrom. In inactive position the bellcrank 163 zeroes against stop 163' (Figure 11). A projection 168 on the cam determines the timer setting. The cam is conveniently mounted on a shaft 170 journalled in the frame 171 and rotatably adjusted to any fixed position by a knob 172.

When the collar 167 moves axially of the shaft under the action of the tripping bellcrank 163, it carries to the right in Figure 10 a lower bellcrank arm 173 of a tripping lever 174 pivoted at 175 in a suitable portion of the frame not shown (Figures 9, 9a and 10). The bellcrank arm 173 is resiliently urged away from the cam 165 by a leaf spring 173'.

The switches as best seen in Figure 9 include contacts 118' and 118 (the lower one) which close to start the synchronous motor, and contacts 125, 124 and 136 which do the switching of other parts of the circuit, all contacts being supported intermediate their ends on a fixed pivot 176 passing through insulation portions thereof and receiving electrical connections through leads 177. The contact 118 is below the contact 118' at the contacting surfaces and the contact 124 is between the upper contact 136 and the lower contact 125.

A contact closing bellcrank 178 behind the contacts has fixed pivot at 180 on the frame (not shown) and consists of a lower arm 181 which pivotally connects to the clutch solenoid armature 158 and an upper rocking plate 182 integral therewith extending over the rear ends of the contacts at insulating portions thereof, and having a series of holes through which pins 183 upstanding on the rear ends of the contacts pass. The pins have heads 184 at their upper ends above the rocking plate and the pins in the contacts are upwardly urged with respect to the rocking plate 182 by compression springs 185.

The insulation portion of the contacts 118 and 124 have bottom recesses 186 forward of the pivots 176 (Figure 9a) and in the initial position in which the clutch is energized the tripping lever 173 engages the insulation of the contacts slightly forward of the recess 86 as shown in Figure 9a. When the collar 167 moves to the right in Figure 10 against the action of the spring 173′ when forced by the cam projection 168, the contacts 118 and 124 drop, the upper end of the tripping lever 173 dropping into the notches 186. This condition occurs when the timer times out, thus opening synchronous motor contacts 118 and 118′, and shifting the movable switch contact 124 from the fixed contact 136 to the fixed contact 125 under the action of the appropriate spring 185.

As shown in Figure 11, the device of Figures 9, 9a and 10 with some changes can equally well be employed as a counter employed at 107 in Figure 5, rather than a timer. In this case instead of the synchronous motor, a counter solenoid 106 is employed, having an armature 187 pivotally connected at 188 to a ratchet arm 190 returned by a tension spring 191 against a suitable stop 190′. The ratchet arm carries a pawl 192 pivoted to the ratchet arm at 193 and urged into engagement by a leaf spring 194. The pawl engages a ratchet 195 on a shaft 196 on which the ratchet arm swings. The ratchet 195 is coaxial with and physically attached to a spur gear 197 which engages the clutch gear 146 already described. By this procedure it is possible to modify the timer of Figures 9, 9a and 10 to function as a counter, the cam protrusion 168 being simply located at a point at which the counter will count out.

When used as a counter, contacts 118, 118′ and 136 can be omitted.

*Softening operation*

In operation of the complete assembly, by reference to Figure 6 it will be noted that at the softening position limit switch 110, 111 is closed, limit switch 110, 122 is open, limit switch 137 is closed, limit switch 133 is closed and limit switch 135 is open. At this stage water is entering through the hard water inlet 44, passing through the rotary valve (Figures 7 and 8) in ports 43, 53 and 60 and 57, 52 and 26, and through connection 24 to the water softener, after which it leaves the water softener by connection 25, and passes through rotary valve parts 32, 56 and 65 and 61, 54 and 46, through the meter 48 and check valve 50 to the service 51.

By reference to Figure 5 it will be evident that the circuit through limit switch 110, 111 energizes the clutch solenoid 112 of counter 107 and also energizes normally closed solenoid valve 77 which permits brine to flow from brine makeup tank 71 to brine measuring tank 80. The two tanks being at the same level will reach equality of level, and in this way the brine measuring tank is charged. Since the brine makeup tank will desirably be many times the size of the brine measuring tank, and since water will be filled into the brine makeup tank to a level controlled by the float valve 74, the quantity of water added to the brine makeup tank after each brining will be small and the concentration of the brine will be quite uniform. The brine makeup tank will normally contain an excess of salt to be dissolved.

As the softening proceeds, the water meter will turn proportional to the flow of softened water passing to the service, and the water meter contacts 101 will close progressively in proportion to the flow. This ticking off by the water meter will continue during the softening operation, and on the next cycle will go forward at the place where it left off, without the necessity of interposing any zeroing mechanism in the water meter, thus greatly simplifying the meter.

Each time the water meter contacts 101 close, the ratchet solenoid 106 is energized, advancing the ratchet of the counter 107 for one tooth. Since the counter clutch solenoid 112 is energized, the clutch 147 advances as the ratchet turns, moving the tripping bellcrank 163 around the cam 165 until the number of impulses is sufficient to bring the tripping bellcrank to the cam projection 168, rocking the lower end of the bellcrank 163 to the right in Figure 10, and through shift of the collar 167 to the right, shifting the tripping lever 173 to the left at the top (Figure 9a) to make the counter count out. The predetermined count of the number of closings of contacts 101 will of course allow for factor of safety in softener operation, making due allowance for the loss of efficiency of the zeolite during its campaign.

During this period while the counter is counting, the clutches of the timers 117 and 127 are both de-energized and the rotary valve motor is de-energized so that the rotary valve remains stationary in the softening position corresponding to zero degrees on the limit switch.

*Backwash*

As soon as the counter 107 has counted out, the counter ratchet trips movable contact 113 (which corresponds in structure to movable contact 124 in Figure 9) to close against fixed contact 114 of the counter (which corresponds in structure to fixed contact 125 in Figure 9). This completes a circuit through clutch 116 of backwash timer 117, energizes the clutch and mechanically closes the motor contacts 118 and 118′ of the backwash timer motor by the action of bellcrank 178 (Figure 9) so as to place the synchronous motor 121 in operation. The motor thus begins the timing of the backwash operation, since clutch gear 144 is driven through the gear train by the synchronous motor, and through the clutch drives shaft 145 and tripping bellcrank 163 around cam 165.

As soon as the backwash timer clutch 116 closes it also closes contacts 124, 136 of the backwash timer due to the action of bellcrank 178, which completes the circuit through limit switch 137 and rotary valve motor 95, starting the valve motor forward. As the rotary valve advances, the limit switches advance (Figure 6), opening limit switch 110, 111 and closing limit switch 110, 122. The opening of limit switch 110, 111 de-energizes counter clutch 112, allowing spiral spring 160 to return tripping bellcrank 163 to zero against a suitable stop 163′ shown in Figure 11. At the same time this de-energizes normally closed solenoid valve 77, allowing it to close and cutting off the flow of brine between the brine makeup tank 71 and the brine measuring tank 80. The closing of limit switch 110, 122 completes the circuit of backwash timer clutch 116, which by motion of bellcrank 178 holds motor contacts 118 and 118′ of the backwash timer closed notwithstanding that the release of clutch 112 of counter 107 releases switch 113, 114, through which clutch 116 had previously been energized, by allowing bellcrank 178 of this counter to return to inactive position. Valve motor 95 stops when limit switch 137 opens at the 90° position (Figure 6) at which point the rotary valve remains stationary for backwashing. It will be understood of course that the time of motion of the valve from the softening to the backwashing position is a negligent portion of the total backwashing time counted by the backwash timer. In backwashing position the connection from the water softener to the service is cut off entirely, and connection is established through the rotary valve from the hard water inlet 44 through ports 43, 53, 61 and 65, 56, 32 to the bottom connection 25 of the softener, and from the top connection 24 of the softener through the rotary valve via ports 26, 52, 60 and 57, 55, 38 into the sump and under the baffle and over the weir to the drain. In case the drain should become clogged, butterfly float valve 41 will partially or wholly close, cutting down on backwash until the water can leave by the drain. When the backwash timer times out, backwashing is stopped by shifting of contact 124 of the backwash timer and forward movement of the rotary valve toward the brine and rinse portion.

The movable contact 124 shifts from the fixed contact 136 to the fixed contact 125 by the action of cam projection 168 in moving arm 164 of bellcrank 163 radially outward (Figures 9 and 10), thus moving the arm 166 of this bellcrank to the right in Figure 10, forcing collar 167 to the right, and urging the radial inner end of tripping lever 173 to the right, thus swinging the tripping lever about its pivots 175, and moving the upper end to the left in Figure 9a until the end of the tripping lever enters slot 186 of the insulation on contact 124, permitting contact 124' to drop under the action of spring 185 until it contacts fixed contact 125.

*Brine-rinse*

As soon as the backwash timer times out, indicating that an adequate time for backwashing has elapsed, the motor causes the tripping of contact 124 to connect with contact 125. This completes the circuit through the brine-rinse timer clutch 126, which closes motor contact 128 of the brine-rinse timer due to the action of bellcrank 178 and starts synchronous motor 130 of the brine-rinse timer, beginning the brine-rinse timing period. At the same time brine-rinse timer contacts 131, 138 close due to the action of bellcrank 178, and since limit switch 133 is closed, this starts the rotary valve motor 95 forward toward the brine-rinse position. This cuts off the connection of the soft water inlet through the rotary valve to the bottom of the softener, while establishing a connection 25 from the bottom of the softener to the drain, through rotary valve parts 32, 56, 65 and 62, 55, 38. Likewise the connection 24 from the hard water inlet to the top of the softener through the rotary valve is cut off by the solid wall of the valve.

As soon as the limit switch assembly reaches the 317¼° position (chosen for brining and rinsing), limit switch 133 opens and limit switch 134 closes. The opening of limit switch 133 breaks the circuit of the rotary valve motor 95, and the closing of limit switch 135 energizes and opens normally closed solenoid valve 87 to begin brining.

The normally closed solenoid valve 87 opens high pressure water from the hard water inlet 44 through pipe 85 and open valve 86 into the eductor 83, thus pumping brine from brine measuring tank 80 through pipe 81 and check valve 82, and discharging the combined stream of brine and water through connection 84 into the top of the water softener. As soon as the content of the brine measuring tank has been discharged down to the level at which the float valve 81 closes, supply of brine through pipe 81 to the eductor ceases, but flow of water through the eductor and the connection 84 continues. Allowance is made in the brine-rinse timing for completion of the discharge of the measured quantity of brine through the eductor into the top of the water softener, and for additional time for rinsing out of the brine. Thus it will be evident that water passes through the pipe 85 during the brine-rinse steps for two purposes: first of all to provide pumping for the brine in the eductor and dilute the brine slightly as it enters the water softener during the brining step, and secondly for the purpose of rinsing the brine out of the water softener after the measured quantity of brine has been pumped from the brine measuring tank 80 into the water softener.

The rotary valve and valve motor remain at this brine-rinse position until the brine-rinse timer times out, at which point contacts 131, 138 are broken and contacts 131, 132 are made (in the same manner as previously described for the backwash timer and the counter), completing the circuit through the rotary valve motor 95, which carries the valve and limit switches forward until the softening position is reached. As the rotary valve and limit switches advance beyond the brine-rinse position, limit switch 133 closes and limit switch 135 opens, de-energizing the normally closed solenoid valve 87 so that it closes, thus cutting off rinsing prior to the shift of the rotary valve to softening position. As the rotary valve shifts to softening position, the connection 25 from the bottom of the softener to the sump is cut off and the softening connections are reestablished, from the hard water inlet through the rotary valve to the top of the water softener at 24 and form the bottom connection 25 of the water softener through the rotary valve to the service.

At the softening position, limit switch 110, 111 closes, energizing the counter clutch 112 of the softening counter 107 and energizing solenoid valve 77, permitting connection between the brine makeup tank and the brine measuring tank to recharge the brine measuring tank. At the same position limit switch 110,122 opens, de-energizing clutch 116 of backwash timer 117, thus opening switch 118 of backwash timer motor 121 by the action of bellcrank 178, and allowing the backwash timer to return to zero under the action of spiral spring 160, and opening contacts 124, 125 under the action of bellcrank 178. By thus opening contacts 124, 125, the clutch 126 of brine-rinse timer 127 is de-energized, opening motor switch 128 of the brine-rinse timer due to the action of bellcrank 178, allowing the brine-rinse timer to return to zero under the action of spiral spring 160, opening contacts 131, 132 of the brine-rinse timer due to the action of bellcrank 178, and stopping the forward motion of the rotary valve motor in softening position by disconnecting the rotary valve motor 95.

The softening cycle now starts again, the contacts 101 of the water meter ticking off in response to the quantity of softened water passing to the service, without any zeroing of the contacts between one cycle and another. Thus it will be seen that the counter counts out and starts over again with its count on each successive cycle, but the water meter contacts continue ticking off impulses indefinitely. The counter when it counts out establishes the beginning of the backwash time cycle, and very early, practically at the beginning of the backwash time cycle, the rotary valve reaches the backwash position. When the backwash timer times out it starts the operation of the brine-rinse timer, and concurrently starts the advance of the rotary valve to the brine-rinse position. Very early and practically at the beginning of the brine-rinse timing cycle the rotary valve advances to the brine-rinse position, and from then on the timing cycle determines the ending of the sequence of brining and rinsing. The end of brining and the beginning of rinsing is determined by the quantity of brine provided for brining purposes.

When the brine-rinse timer times out it establishes the start of the softening counter and advances the rotary valve to the softening position. At the same time the timers are zeroed and the cycle is ready to be repeated.

While I have shown a particular form of timer which is desirable and which consists of a synchronous motor and clutch, it will be understood that any other suitable form of timer may be used. Likewise while I have shown an electromagnetic counter, it will be evident that any other suitable form of counter may be employed.

It will be evident that one of the important advantages of the invention is the great adaptability and flexibility to different installations, by which it is possible to make adjustment for differences in water or zeolite composition by correspondingly changing the position at which the counter will count out, and also to make adjustments in the water softener cycle by changing the timing of the backwash cycle or of the brine and rinse cycle, or of the brining alone.

In view of my invention and disclosure variations and modifications to meet individual whim or particular need will doubtless become evident to others skilled in the art, to obtain all or part of the benefits of my invention without copying the process and structure shown, and I, therefore, claim all such insofar as they fall within the reasonable spirit and scope of my claims.

Having thus described my invention what I claim as new and desire to secure by Letters Patent is:

1. In a water softening mechanism, a softener, a raw water connection, a service connection, a drain and a connection to a source of brine, in combination with valve means having ports for one position directing water from the raw water connection through the softener to the service connection, in a second position directing water in reverse through the softener to the drain while cutting off the service connection and in a third position directing brine from the brine source through the softener to the drain while cutting off the service connection, a water meter responsive to the flow of water through the softener in softening, electric contact means on the water meter for making contact at intervals corresponding to the flow of water through the meter, an electric counter for counting a predetermined number of impulses resulting from closing of the electric contact means, electrically operated means cooperating with the valve means and put in operation by the counter when the predetermined count is reached for cutting off the flow of water from the raw water connection to service connection through the softener in the first position, and for establishing flow of water for backwashing from the raw water connection to the drain through the softener in reverse in the second position, a first timer set in operation by the counter for measuring a predetermined time for backwashing, electrically operated means cooperating with the valve means and put in operation by the first timer for cutting off the flow of backwash through the softener and connecting the source of brine through the softener to the drain in the third position, a second timer put in operation by the first timer for timing a period to include the brining and electrically operated means cooperating with the valve means and put in operation by the second timer for shifting the softener from brining to softening in the first position.

2. In a water softening mechanism, a softener, a raw water connection, a service connection, a drain and a connection to a source of brine, in combination with valve means having ports for one position directing water from the raw water connection through the softener to the service connection, in a second position directing water in reverse through the softener to the drain while cutting off the service connection and in a third position directing brine from the brine source and rinse water through the softener to the drain while cutting off the service connection, a water meter responsive to the flow of water through the softener in softening, electric contact means on the water meter for making contact at intervals corresponding to the flow of water through the meter, an electric counter for counting a predetermined number of impulses resulting from closing of the electric contact means, electrically operated means cooperating with the valve means and put in operation by the counter when the predetermined count is reached for cutting off the flow of water from the raw water connection to the service connection through the softener in the first position and for establishing flow of water for backwashing from the raw water connection to the drain through the softener in reverse in the second position, a first timer set in operation by the counter for measuring a predetermined time for back-washing, electrically operated means cooperating with the valve means and put in operation by the first timer for cutting off the flow of backwash through the softener and connecting the source of brine through the softener to the drain in the third position, means for measuring the quantity of brine and cutting off the brine after the measured quantity has been introduced, means for introducing rinse water through the softener to the drain in the third position after the measured quantity of brine has been introduced, a second timer put in operation by the first timer and measuring the time of brining plus rinsing, and electrically operated means cooperating with the valve means and put in operation by the second timer for cutting off the rinse and connecting the raw water connection through the softener to the service in the first position.

3. In water softener mechanism, a water softener, a raw water connection, a service connection, a backwash connection, a drain and a connection to a source of brine, in combination with a water meter responding to the flow of water through the softener, electrical contact means periodically closed by the water meter, an electrical counter actuated by the electrical contact means and counting out when a predetermined count is reached, the counter including means for returning to zero at the beginning of each cycle, a backwash timer put in operation by the electrical counter at the completion of a predetermined count, valve means operated by the counter for cutting off the softener from the raw water connection and the service connection and connecting reverse flow through the softener from the backwash connection to the drain, a brining timer put in operation by the backwash timer when it times out, valve means put in operation by the backwash timer when it times out for cutting off the flow from the backwash connection to the softener and opening flow from the source of brine to the softener, and valve means put in operation by the brining timer when it times out for closing the connection from the source of brine to the softener and opening the connection from the raw water connection to the service connection through the softener, and automatic means for restoring the backwash timer and the brining timer to zero.

4. In water softener mechanism, a water softener, a raw water connection, a service connection, a backwash connection, a rinse connection, a drain and a connection to a source of brine, in combination with a water meter responding to the flow of water through the softener, electrical contact means periodically closed by the water meter, an electrical counter actuated by the electrical contact means and counting out when a predetermined count is reached, the electrical counter including means for returning to zero at the beginning of each cycle, a backwash timer put in operation by the electrical counter at the completion of a predetermined count, valve means operated by the counter for cutting off the softener from the raw water connection and the service connection and connecting reverse flow through the softener from the backwash connection to the drain, a brining timer put in operation by the backwash timer when it times out, valve means put in operation by the backwash timer when it times out for cutting off the flow from the backwash connection to the softener and opening flow from the source of brine and from the rinse connection to the softener, valve means for closing the connection to the source of brine when a predetermined quantity of brine has been discharged while continuing the flow of water from the rinse connection, valve means put in operation by the brining timer when it times out for cutting off flow from the rinse connection and connecting the raw water connection to the service connection through the softener and automatic means for restoring the backwash timer and the brining timer to zero.

5. In water softening mechanism, a water softener, a raw water connection, a backwash connection, a service connection, a rinse water connection, a drain and a connection to a source of brine, in combination with a water meter responsive to flow of water through the softener during softening, electric contact means operated by the water meter for closing the contacts in response to the flow, an electric counter advanced by the closing of the electric contacts and tripped when it counts out, a zeroing device for restoring the electric counter to zero after it has counted out, an electric backwash timer put in operation by the electric counter when it has counted out, valves operating in the start of the cycle of the backwash timer for disconnecting the raw water and service connections from the softener and establishing backwash and drain connections to the softener, a brining timer put in operation by the backwash timer when it times out, valves operated during the beginning of the time interval of the brining timer for introducing brine from the source and rinse water from the connection to the softener and connecting the softener to the drain, a device for measuring the quantity of brine supplied to the softener and valves operated when the brining timer times out for disconnecting the brine rinse and drain connections from the softener and connecting the raw water and service connections to the softener.

6. In water softening mechanism, a softener, a raw water connection, a backwash connection, a service connection, a rinse water connection, a drain and a connection to a source of brine, in combination with a water meter responsive to flow of water through the softener during softening, electric contact means operated by the water meter for closing the contacts in response to the flow, an electric counter advanced by the closing of the electric contacts and tripped when it counts out, a zeroing device for restoring the electric counter to zero after it has counted out, an electric backwash timer put in operation by the electric counter when it has counted out, valves operated in the start of the time interval of the backwash timer for disconnecting the raw water and service connections from the softener and establishing backwash and drain connections to the softener, a brining timer put in operation by the backwash timer when it times out, valves operated during the beginning of the time interval of the brining timer for introducing the brine from the source and rinse water from the connection to the softener and connecting the softener to the drain, a device for measuring the quantity of brine supplied to the softener, valves operated when the brining timer times out for disconnecting the brine, rinse and drain connections from the softener and connecting the raw water and service connections to the softener, and means operative when the brining timer times out for zeroing the backwash timer and the brining timer.

7. In water softening mechanism, a softener having a normal inlet and outlet, a raw water connection, a service connection, a backwash connection, a rinse water connection, a drain and a connection to a source of brine, in combination with a water meter responsive to the flow of water through the softener during softening, electrical contacts periodically closed by the water meter in response to flow through the meter, an electric counter operatively connected to the contacts to count the number of times the contacts close, a first switch closed by the electric counter when the counter counts out, a valve motor operatively connected to the first switch, a rotary valve having connections to both sides of the softener, to the raw water connection, to the service connection and to the drain, the rotary valve being operatively connected to the valve motor, a first limit switch which disconnects the valve motor when it has advanced to a position at which the normal inlet to the softener is disconnected from the raw water connection and the normal outlet from the softener is disconnected from the service connection while the backwash connection is connected through the rotary valve to the drain, a backwash timer put in operation when the counter counts out, a second switch operated when the backwash timer counts out and operatively connected to start the valve motor and drive the rotary valve forward to a position at which the softener is disconnected from the backwash connection and connected to the source of brine and to the drain, a second limit switch for disconnecting the valve motor when the rotary valve reaches this position, a brining timer put in operation by the backwash timer, a third switch closed when the brining timer counts out and operatively connected in the valve motor circuit to advance the rotary valve to a position at which the connection to the source of brine is closed off, the drain is closed off and the raw water connection and the service connection are connected respectively to the normal inlet and outlet of the softener, and a third limit switch operated when the brining counter counts out and operatively connected to the valve motor to stop the advance of the motor when the rotary valve has reached the position at which the raw water connection and the service connection are connected to the softener.

8. In water softening mechanism, a softener having a normal inlet and outlet, a raw water connection, a service connection, a backwash connection, a rinse water connection, a drain and a connection to a source of brine, in combination with a water meter responsive to the flow of water through the softener during softening, electrical contacts periodically closed by the water meter in response to flow through the meter, an electric counter operatively connected to the contacts to count the number of times the contacts close, a first switch closed by the electric counter when the counter counts out, a valve motor operatively connected to the first switch, a rotary valve having connections to both sides of the softener, to the raw water connection, to the service connection and to the drain, the rotary valve being operatively connected to the valve motor, a first limit switch which disconnects the valve motor when it has advanced to a position at which the normal inlet to the softener is disconnected from the raw water connection and the normal outlet from the softener is disconnected from the service connection while the backwash connection is connected through the rotary valve to the drain, a backwash timer put in operation when the counter counts out, a second switch operated when the backwash timer counts out and operatively connected to start the valve motor and drive the rotary valve forward to a position at which the softener is disconnected from the backwash connection and connected to the source of brine and to the rinse water connection, a second limit switch for disconnecting the valve motor when the rotary valve reaches this position, a brining timer put in operation by the backwash timer, a third switch closed when the bringing timer counts out and operatively connected in the valve motor circuit to advance the rotary valve to a position at which the connection to the source of brine and to the rinse water connection is closed off, the drain is closed off and the raw water connection and the service connection are connected respectively to the normal inlet and outlet of the softener, and a third limit switch operated when the brining counter counts out and operatively connected to the valve motor to stop the advance of the motor when the rotary valve has reached the position at which the raw water connection and the service connection are connected to the softener.

9. In a water softening device, a softener, a raw water connection, a service connection, a backwash connection, a rinse water connection, a drain and a connection to a source of brine, in combination with a water meter responsive to the flow of softened water through the softener, contacts operated by the water meter and periodically closed in proportion to flow through the meter, a counter responsive to the closing of the contacts and counting the number of times which the contacts close, a valve motor, a rotary valve operatively connected to and driven by the motor and having connections to the raw water connection, the service and the drain and from and to the softener, electric circuit means for driving the valve motor including a first switch closed by the counter when the counter counts out, electric circuit means including a first limit switch for stopping the motor when the valve has advanced to a position at which it cuts off the water softening connections between the raw water inlet and the service and establishes a connection for the backwash water through the softener to the drain, a backwash timer operatively connected to and started by the counter when it counts out, electric circuit means including a second switch tripped by the backwash timer when it times out which starts the valve motor forward against electric circuit means including a second limit switch for stopping the forward motion of the rotary valve when the connection of the backwash water through the softener to the drain has been broken and a connection from the source of brine and from the rinse water through the softener to the drain has been established, means for establishing a connection from the source of brine and from the rinse water to the softener at this time, a float valve for closing the flow of brine through the softener when the source of brine drops to a predetermined level, a brining timer operatively connected to and started by the backwash timer when it times out, eelctric circuit means including a third switch tripped by the brining timer and operatively connected to the valve motor to drive the valve forward when the brining timer times out, electric circuit means including a third limit switch for disconnecting the circuit of the valve motor when the rotary valve has moved forward to a position at which it has broken the connection to the drain and established connection from the raw water inlet through the softener to the service, and electric circuit means for closing the connection between the source of brine and the rinse water and the softener when the brining timer times out.

10. In a water softening device, a softener, a raw water connection, a service connection, a backwash connection, a rinse water connection, a drain and a connection to a source of brine, in combination with a water meter responsive to the flow of softened water through the softener, contacts operated by the water meter and periodically closed in proportion to flow through the meter, a counter responsive to the closing of the contacts and counting the number of times which the contacts close, a valve motor, a rotary valve operatively connected to and driven by the valve motor and having connections to the raw water connection, the service and the drain and from and to the softener, electric circuit means for driving the valve motor including a first switch closed by the counter when the counter counts out, electric circuit means including a first limit switch for stopping the valve motor when the rotary valve has advanced to a position at which it cuts off the water softening connections between the raw water inlet and the service and establishes a connection for the backwash water through the softener to the drain, a backwash timer operatively connected to and started by the counter when it counts out, electric circuit means including a second switch tripped by the backwash timer when it times out which starts the valve motor forward again, electric circuit means including a second limit switch for stopping the forward motion of the rotary valve when the connection of the backwash water through the softener to the drain has been broken and a connection from the source of brine and from the rinse water through the softener to the drain has been established, means for establishing a connection from the source of brine and from the rinse water to the softener at this time, a float valve for closing the flow of brine through the softener when the source of brine drops to a predetermined level, a brining timer operatively connected to and started by the backwash timer when it times out, electric circuit means including a third switch tripped by the brining timer and operatively connected to the valve motor to drive the valve forward when the brining timer times out, electric circuit means including a third limit switch for disconnecting the circuit of the valve motor when the rotary valve has moved forward to a position at which it has broken the connection to the drain and established connection from the raw water inlet through the softener to the service, electric circuit means for closing the connection between the source of brine and the rinse water and the softener when the brining timer times out, and electrical means for connecting the brine makeup tank with the source of brine when the third limit switch operates.

11. In a water softening device, a softener, a raw water connection, a service connection, a backwash connection, a rinse water connection, a drain and a connection to a source of brine, in combination with a water meter responsive to the flow of softened water through the softener, a contact operated by the water meter and periodically closed in proportion to flow through the meter, a counter responsive to the closing of the contacts and counting the number of times which the contacts close, a valve motor, a rotary valve operatively connected to and driven by the valve motor and having connections to the raw water connection, the service and the drain and from and to the softener, electric circuit means for driving the valve motor including a first switch closed by the counter when the counter counts out, electric circuit means including a first limit switch operatively connected to the rotary valve for stopping the valve motor when the rotary valve has advanced to a position at which it cuts off the water softening connections between the raw water inlet and the service and establishes a connection for the backwash water through the softener to the drain, a backwash timer operatively connected to and started by the counter when it counts out, electric circuit means including a second switch tripped by the backwash timer when it times out which starts the valve motor forward again, electric circuit means including a second limit switch operatively connected to the rotary valve for stopping the forward motion of the rotary valve when the connection of the backwash water through the softener to the drain has been broken and a connection from the source of brine and from the rinse water through the softener to the drain has been established, means including a solenoid valve, an eductor and connections for rinse water and brine to the eductor and from the eductor to the softener for brining and rinsing, electric circuit means including a third limit switch operatively connected to the rotary valve for opening the solenoid valve, a float valve for closing the flow of brine through the softener when the source of brine drops to a predetermined level, a brining timer operatively connected to and started by the backwash timer when it times out, electric circuit means including a third switch tripped by the brining timer and operatively connected to the valve motor to drive the valve forward when the brining timer times out, electric circuit means including a fourth limit switch operatively connected to the rotary valve for disconnecting the circuit of the valve motor when the valve has moved forward to a position at which it has broken the connection to the drain and established connection from the raw water inlet through the softener to the service and electrical means for closing the solenoid valve between the source of brine and the source of rinse water and the softener when the brining timer times out.

12. In a water softening device, a softener, a raw water connection, a service connection, a backwash connection, a rinse water connection, a drain, a brine makeup tank, and a brine measuring tank connected thereto, in combination with a water meter responsive to the flow of softened water through the softener, electrical contacts operated by the water meter and periodically closed in proportion to flow through the meter, a counter responsive to the closing of the contacts and counting the number of times which the contacts close, a valve motor, a rotary valve operatively connected to and driven by the valve motor and having connections to the raw water connection, the service and the drain and to and from the softener at the top and bottom respectively, electrical circuit means for driving the valve motor including a first switch closed by the counter when the counter counts out, electric circuit means including a first limit switch operatively connected to the rotary valve for stopping the valve motor when the rotary valve has advanced to a position at which it cuts off the water softening connection between the raw water inlet and the service and establishes a connection for the backwash water through the softener to the drain, a backwash timer operatively connected to and started by the counter when it counts out, electric circuit means including a second switch tripped by the backwash timer when it counts out which starts the valve motor forward again, electric circuit means including a second limit switch operatively connected to the rotary valve for stopping the forward motion of the rotary valve when the connection of the backwash water through the softener has been broken and a connection to the brine and to the rinse water through the softener to the drain has been established, means including a solenoid valve, an eductor and connections for rinse water and brine to the eductor and from the eductor to the softener for brining and rinsing, electric circuit means including a third limit switch operatively connected to the rotary valve and for opening the solenoid valve, a float valve for closing the flow of brine from the measuring tank through the eductor to the softener when the brine level drops to a predetermined point, a brining timer operatively connected to and started by the backwash timer when it times out, electric circuit means including a third switch tripped by the brining timer and operatively connected to the valve motor to drive the valve forward when the brining timer times out, electric circuit means including a fourth limit switch operatively connected to the rotary valve for disconnecting the circuit of the valve motor when the valve has moved forward to a position at which it has broken the connection to the drain and established connection from the raw water inlet through the softener to the service, electric means for closing the solenoid valve between the source of brine and the source of rinse water and the softener when the brining timer times out and electrical means for connecting the brine makeup tank with the brine measuring tank when the fourth limit switch operates and for disconnecting the same when the fourth limit switch does not operate.

References Cited in the file of this patent

UNITED STATES PATENTS

| Number | Name | Date |
|---|---|---|
| 1,688,366 | Tomkinson | Oct. 23, 1928 |
| 1,697,095 | Turner | Jan. 1, 1929 |
| 1,704,982 | Lindsay | Mar. 12, 1929 |
| 1,740,540 | Eisenhauer | Dec. 24, 1929 |
| 1,793,670 | Borrowman | Feb. 24, 1931 |
| 1,851,927 | McCord | Mar. 29, 1932 |
| 1,893,933 | Dotterweich | Jan. 10, 1933 |
| 1,914,333 | Staegemann | June 13, 1933 |
| 2,051,155 | Staegemann | Aug. 18, 1936 |
| 2,155,318 | Liebknecht | Apr. 18, 1939 |
| 2,217,822 | Symons | Oct. 15, 1940 |
| 2,240,171 | Brice et al. | Apr. 29, 1941 |
| 2,351,648 | Whitlock | June 20, 1944 |
| 2,422,054 | Tiger | June 10, 1947 |
| 2,447,520 | McGill et al. | Aug. 24, 1948 |
| 2,539,748 | Mueller | Jan. 30, 1951 |